C. O. LUCE.
Broadcast-Seeder.

No. 15,104 — Patented June 10 1856

UNITED STATES PATENT OFFICE.

C. O. LUCE, OF FREEPORT, ILLINOIS.

IMPROVEMENT IN SEEDING-MACHINES.

Specification forming part of Letters Patent No. 15,104, dated June 10, 1856.

*To all whom it may concern:*

Be it known that I, C. O. LUCE, of Freeport, in the county of Stephenson and State of Illinois, have invented a new and Improved Seeding-Machine for Sowing Seed Broadcast; and I do hereby declare that the following is a full, clear, and exact description of the same, reference being had to the annexed drawings, making a part of this specification, in which—

Figure 1:
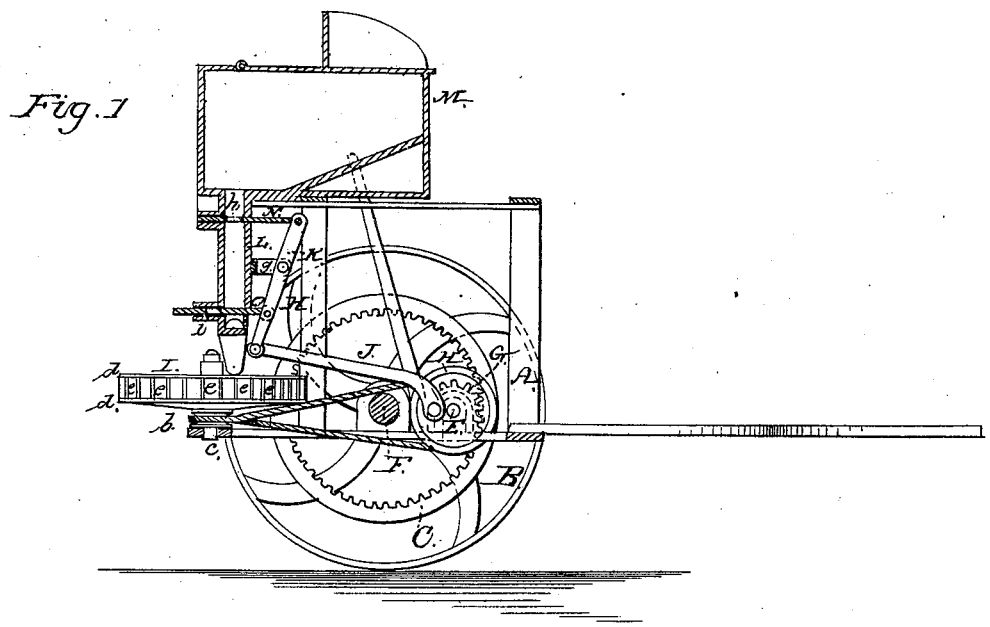
Figure 2:
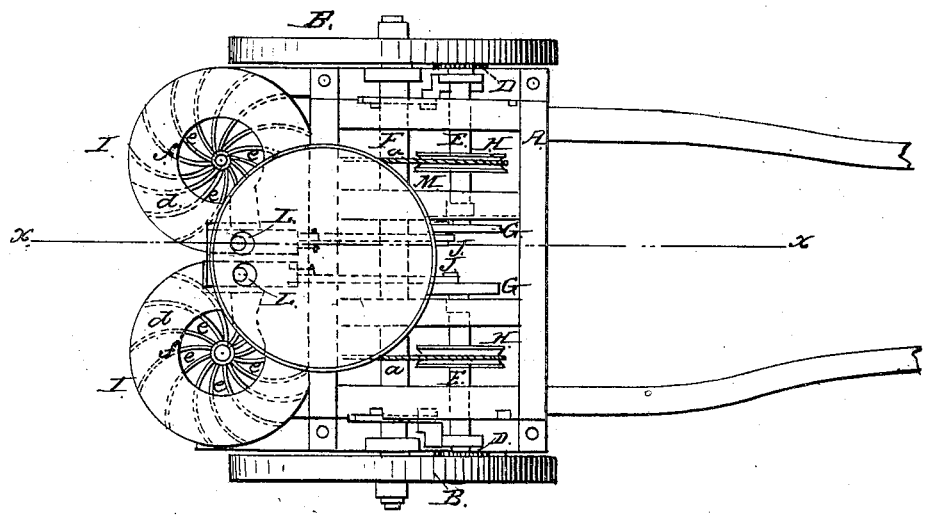

Figure 1 is a longitudinal vertical section of my improvement, $x\ x$, Fig. 2, showing the plane of section. Fig. 2 is a plan or top view of the same.

Similar letters of reference indicate corresponding parts in the two figures.

My invention consists in the employment or use of valves placed or fitted in conveying-tubes and used in connection with distributing wheels, the above parts being constructed, arranged, and operating as will be hereinafter fully shown and described.

To enable those skilled in the art to fully understand and construct my invention, I will proceed to describe it.

A represents a frame, which is placed upon two wheels, B B. Each wheel has a rim, C, secured to its inner side, said rims being toothed on their inner peripheries. The toothed rims gear into pinions D D, which are attached to shafts E E, placed in the frame A, longitudinally with the axle F of the wheels B B. On the inner end of each shaft E there is fitted a pulley, G, and a pulley, H, is also fitted on each shaft, the pulleys H having belts $a$ passing around them, which belts also pass around pulleys $b$, fitted on the axes $c$ of distributing-wheels I I.

The distributing-wheels are placed in a horizontal position and side by side at the back part of the frame A. They may be formed each of two disks, $d\ d$, with curved vertical plates $e$ secured between them, the upper disks having holes or apertures $f$ made through them, through which holes the seed passes into the wheels I I.

To the pulleys G, and near their peripheries, there are attached connecting-rods J J, one to each pulley. The outer or back ends of the rods J J are attached to the lower ends of levers K K, which are pivoted to arms $g\ g$, attached to two conveying-tubes, L L, which are secured to the lower end of a hopper or seed-box, M, and communicate with it.

The upper ends of the levers K K have two perforated slides or valves, N N, attached to them, one to each, and two similar slides or valves, O O, are attached to the lower parts of the levers. These slides or valves are fitted horizontally in the conveying-tubes L L, as clearly shown in Fig. 1.

The operation is as follows: The hopper or seed-box M is filled with seed, and as the machine is drawn along the wheels I I are rotated from the shafts E E by means of the belts $a\ a$, which pass around the pulleys H $b$. A reciprocating motion is given the slides or valves N N O O, the upper and lower valves moving simultaneously in opposite directions. When the apertures $h$ in the upper slides or valves are in line with the tubes L L the seed will pass through the apertures in the upper slides or valves and down upon the lower slides or valves, O O, the apertures $i$ of which are out of line with the tubes L L, and when the apertures $h$ in the upper slides or valves are thrown out of line with the tubes L L the apertures $i$ in the lower slides or valves are brought in line with them, and the seed passes through the apertures $i$ in the lower slides or valves and into the spaces formed by the plates $e$ in the wheels I I, and is thrown from them by centrifugal force.

The slides or valves, it will be seen, act as cut-offs, and insure an equal distribution of seed.

I do not claim separately the distributing-wheels I I, for they have been previously used; but What I do claim as new, and desire to secure by Letters Patent, is—

The distributing-wheels I I, in combination with the slides or valves N N O O, arranged and operating as shown, for the purpose specified.

C. O. LUCE.

Witnesses:
R. T. MARSH,
WM. M. KIMBALL.